United States Patent [19]
Nichols

[11] Patent Number: 4,940,324
[45] Date of Patent: Jul. 10, 1990

[54] ELECTRONIC SIGHT HAVING A LARGER HORIZONTAL VIEWING FIELD THAN A VERTICAL VIEWING FIELD AND METHOD OF MAKING SAME

[75] Inventor: Joseph W. Nichols, Mehoopany, Pa.

[73] Assignee: American Advantage Company, Portland, Oreg.

[21] Appl. No.: 198,333

[22] Filed: May 25, 1988

[51] Int. Cl.$^5$ .................. G02B 23/00; G02B 23/10
[52] U.S. Cl. ................................. 356/247; 356/251
[58] Field of Search ................. 356/247, 251–255

[56] References Cited

U.S. PATENT DOCUMENTS

| | | | |
|---|---|---|---|
| 2,633,051 | 3/1953 | Davis | 356/251 |
| 3,915,552 | 10/1975 | Rickert | 356/252 X |
| 3,942,901 | 3/1976 | Ekstrand | 356/251 |
| 3,963,356 | 6/1976 | Wiklund | 356/251 |
| 4,279,191 | 6/1981 | Johansson | 89/185 |
| 4,402,605 | 9/1983 | Ekstrand | 356/252 |
| 4,722,607 | 2/1988 | Anselment et al. | 356/417 |

OTHER PUBLICATIONS

Aimpoint TM The Advantage, Aimpoint 2000.

*Primary Examiner*—Vincent P. McGraw
*Attorney, Agent, or Firm*—Seed and Berry

[57] ABSTRACT

An electronic sight having a horizontal field of view greater than the vertical field of view. The electronic sight is mounted to pivot about two axes to provide windage and elevational adjustment. A windage adjustment screw includes a windage adjustment disk that extends from a base slot into a sight tube slot. The slot in the base is elongated in a first direction and the slot in the sight tube is elongated in a second transverse direction. Rotating the windage adjustment screw moves the windage disk to cause the sight tube to pivot about a vertical axis. An elevation jack raises and lowers the sight tube to pivot the sight tube about a horizontal axis. The sight tube has a raised rail on the top that acts as a key for aid in attaching and adjusting the battery assembly and light source relative to the sight tube lens. The sight tube includes grooves on an inner surface to aid in reducing the effect of glare from ambient light. The sight tube is made as an extrusion to significantly lower manufacturing costs.

39 Claims, 4 Drawing Sheets

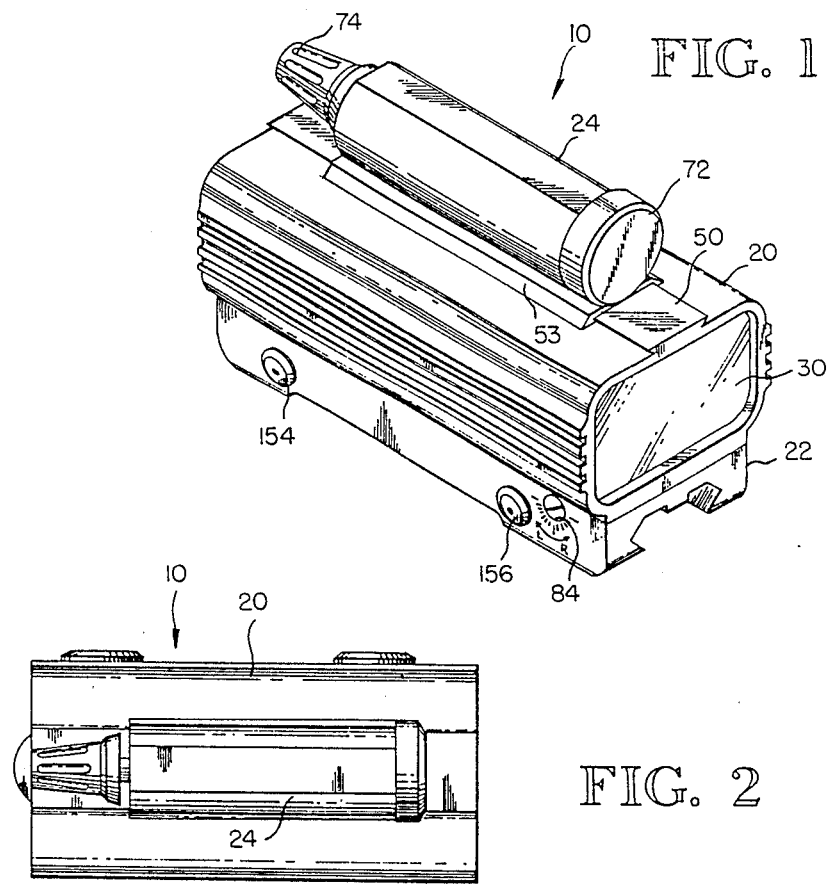
FIG. 1
FIG. 2
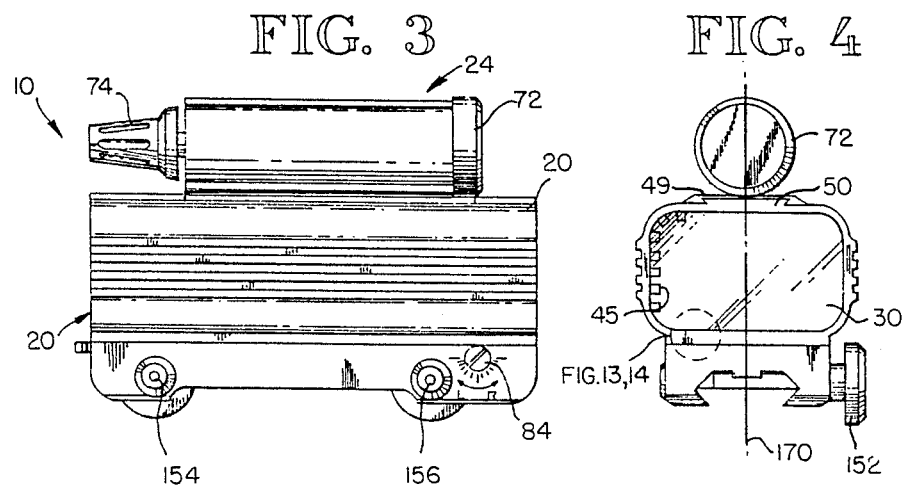
FIG. 3
FIG. 4

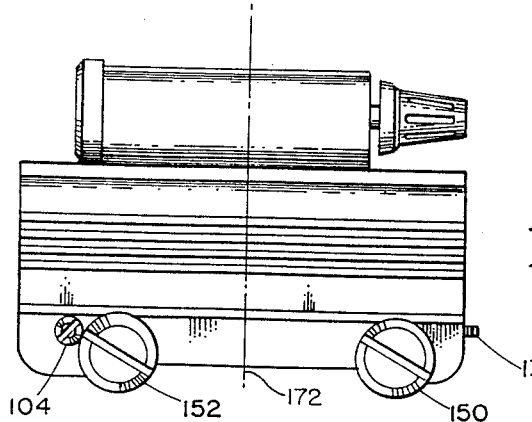
FIG. 5
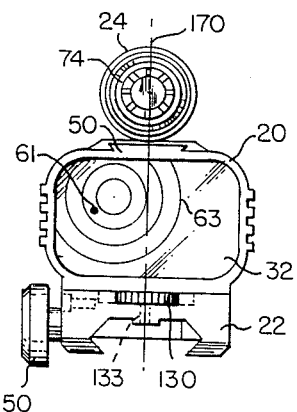
FIG. 6
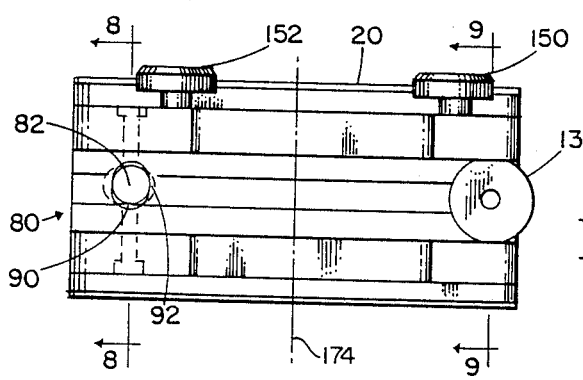
FIG. 7
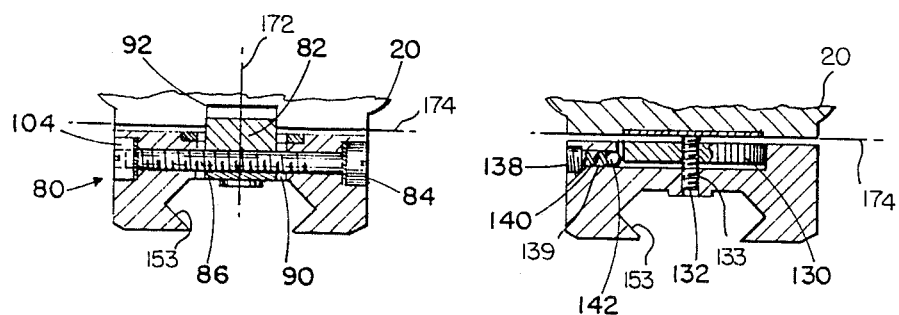
FIG. 8
FIG. 9

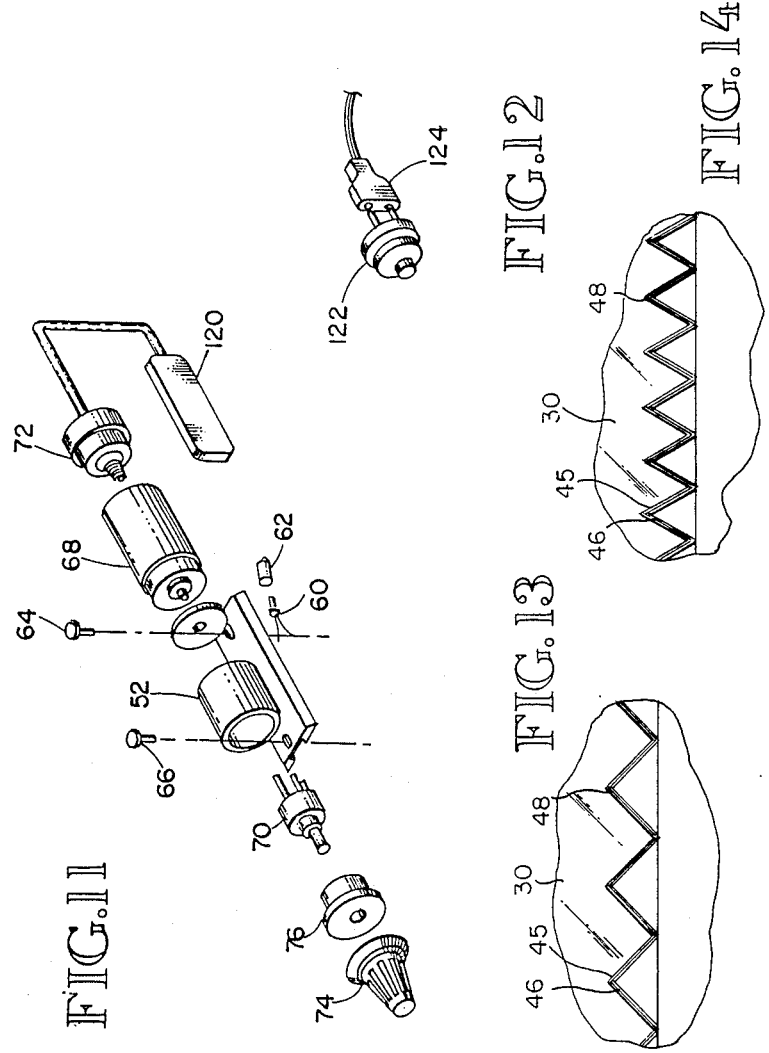

ELECTRONIC SIGHT HAVING A LARGER HORIZONTAL VIEWING FIELD THAN A VERTICAL VIEWING FIELD AND METHOD OF MAKING SAME

TECHNICAL FIELD

This invention relates to electronic sights, and more particularly, to a sight tube, light source and base; the coupling between the sight tube, light source and base; and the method of manufacture of same.

BACKGROUND OF THE INVENTION

Electronic sights have recently been developed to aid a shooter in hitting a target when firing a gun, bow, crossbow, or the like. In an electronic sight, a dot of light is reflected from a front lens for viewing by a shooter. The shooter views the target through the sight and places the dot of light over the target on the intended point of impact. The projectile will impact at the point covered by the dot of light, provided the scope is properly aligned with the gun.

The basic principles of operation of an electronic sight are well-known in the art. A light source projects a narrow beam of light onto a specially coated lens. Light is reflected by a reflecting lens to the eye of the shooter. The light is seen by the shooter as a small, colored dot appearing on the lens. The lens also permits the shooter to simultaneously see objects through the lens. The dot of light on the lens becomes the aiming point. The light dot overlays the point of impact of the projectile expelled from the firearm at the particular range for which the gun sight is adjusted. The intensity of the aiming dot is adjustable by a voltage control that allows the shooter to increase or decrease the brightness of the light.

The electronic sight differs from conventional telescopic sights in that there is no magnification of the field of view as viewed through the sight. The object aligned with the intended target is a dot of light, not an etched cross-hair pattern. Electronic sights are described in a publication by Aimpoint describing the Aimpoint 2000 Series electronic sight and Pat. Nos. 3,942,901; 3,963,356 and 4,402,605, each of which is incorporated herein by reference.

Electronic sights presently in use are extremely expensive and difficult to make. The sight tube is made from precision castings. These are very expensive and restrict changes in the sight. This results in very high production costs and expensive tooling requirements. The sight tubes presently in use are circular, the lenses therein having the same vertical and horizontal dimensions. The lenses are held in place by threaded lens retainers that are costly to manufacture and costly to assemble.

The position of the light source (usually a light-emitting diode (LED)), with respect to the front reflective lens is critical. If the light source is not perfectly positioned to very tight tolerances, the lens will not properly reflect the light and the sight will not function properly. In present electronic sights, the mounting of the light source is manually performed on each sight to ensure that it is accurate. The present method of positioning the light source is to first drill an oversized hole. The light source is placed in this hole and held in position by the hand of the person building the scope. The person moves the light source by hand until it is properly aligned with the front lens. The light source is then glued into place and held by hand while the glue dries, to ensure that the light source does not move. This is not a reliable method of ensuring that the light source is properly aligned, and errors often occur in the alignment, resulting in a lower quality product than desired. Under rough handling or harsh field conditions, the glue may be jarred loose, ruining the sight. Further, this is an expensive and time-consuming method of placing the LED in position.

SUMMARY OF THE INVENTION

It is an object of this invention to provide a locating key on the sight tube to ensure that the light source, such as an LED, is properly positioned with respect to the front lens.

It is another object of this invention to provide a sight tube having a greater horizontal measurement than the vertical measurement to provide a better view of the target with a lower profile sight.

It is another object of this invention to provide a pivotal attachment between the sight tube and a base to permit the elevation and windage of the sight tube to be easily adjusted independent of each other.

It is another object of this invention to provide a lens that darkens its tint in bright light to aid the shooter in aiming the firearm.

It is another object of this invention to provide an electronic sight having a sight tube made by an extrusion, resulting in an electronic sight that is inexpensive to manufacture but more reliable and of higher quality than previously manufactured electronic sights.

These and other objects of the invention as described herein are accomplished by providing an electronic sight having a base and a sight tube pivotally attached to the base. The sight tube includes a front lens from which a light is reflected and a back lens through which the reflected light passes. A light source and a battery are attached to the sight tube to provide the light.

The lenses have a greater horizontal field of view than a vertical field of view. The sight tube includes a raised ridge acting as a key to aid in accurately aligning the light source with respect to the front lens. A housing holding the light source is aligned with and attached to this key. The sight tube is pivotally connected to the base, which is rigidly attached to the firearm. An elevation screw coupled through an elevation jack varies the angle of the sight tube with respect to the firearm barrel to permit the range to be properly adjusted. A windage adjustment assembly is coupled through the base to the sight tube for adjusting the horizontal position of the sight tube with respect to the firearm barrel.

The sight tube is made by an extrusion. The extrusion includes interior inwardly projecting protrusions for providing grooves on the inside of the sight tube to reduce glare.

A remote battery switch is optionally provided at a convenient location, such as on the handle of a pistol or near the trigger of the firearm, to permit the light to be turned on and off easily and quickly. Further, the battery may be carried at a remote site, such as in a shirt pocket, and coupled by wires to the light source on the sight tube to reduce the weight of the sight.

BRIEF DESCRIPTION OF THE DRAWINGS

FIG. 1 is an isometric view of the gun sight.

FIG. 2 is a top plan view of the gun sight of FIG. 1.

FIG. 3 is a left side elevational view of the gun sight of FIG. 1.

FIG. 4 is a front end view of the gun sight of FIG. 1.

FIG. 5 is a right side elevational view of the gun sight of FIG. 1.

FIG. 6 is a back end view of the gun sight of FIG. 1.

FIG. 7 is a bottom plan of the base and sight tube of FIG. 1.

FIG. 8 is an enlarged cross section of the sight tube taken substantially along the line 8—8 of FIG. 7, showing the windage adjustment assembly.

FIG. 9 is an enlarged cross section of the sight tube taken substantially along the line 8—8 of Figure 7, showing the elevation jack assembly.

FIG. 11 is an isometric view of a remote switch attachable to the gun sight of FIG. 1 in an alternative embodiment.

FIG. 12 is an isometric view of a remote battery connection attachable to the gun sight of FIG. 1 in an alternative embodiment.

FIG. 13 is an enlarged end view of the grooves inside the scope taken from portions shown in FIG. 4.

FIG. 14 is an enlarged end view of an alternative embodiment of the grooves inside the scope taken from the portion shown in FIG. 4.

DETAILED DESCRIPTION OF THE INVENTION

Figure 10:
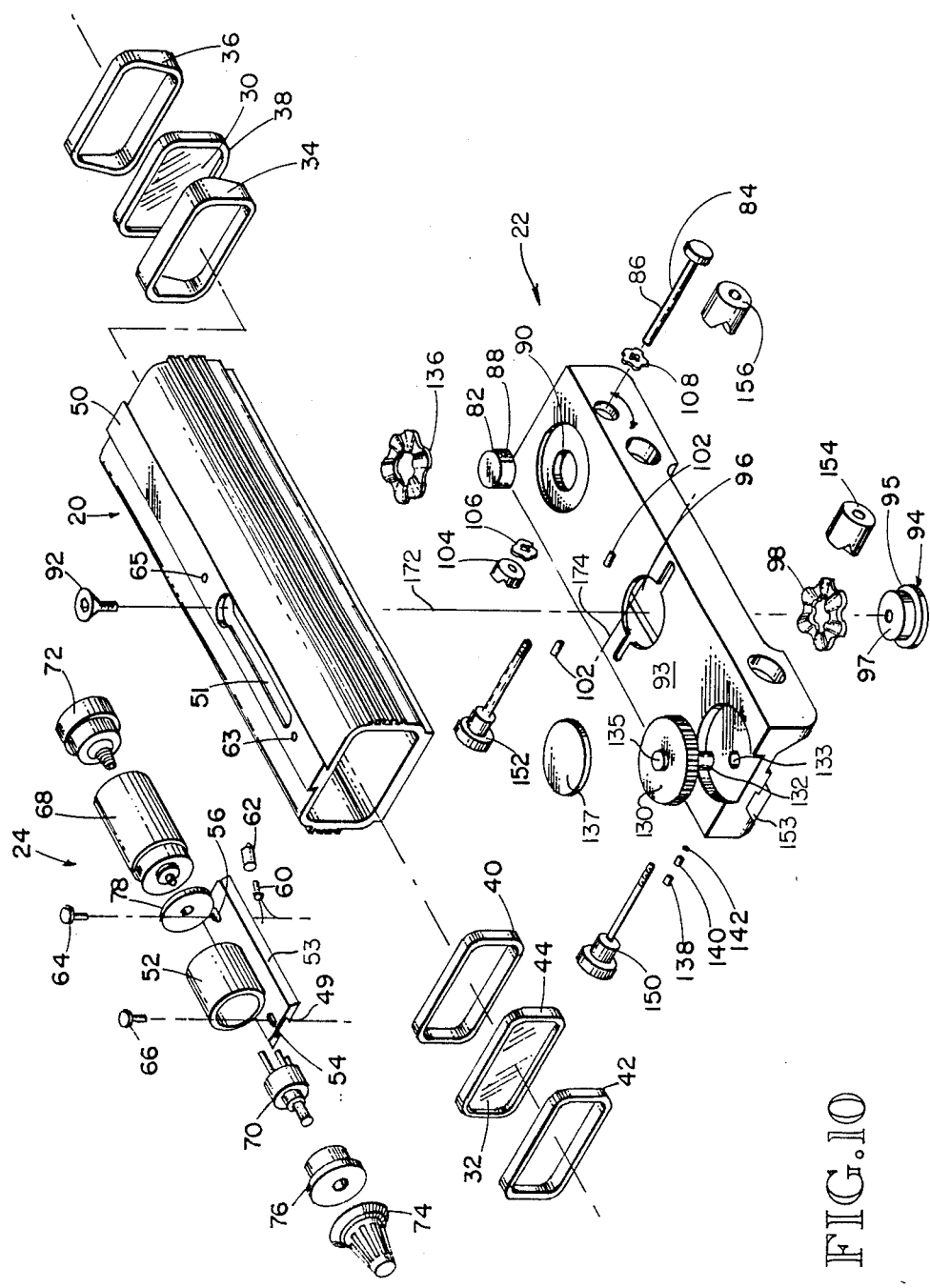
FIG. 10 is an exploded isometric view of the gun sight of FIG. 1.

An electronic sight 10 of the present invention includes a sight tube 20, a base 22, and a battery assembly 24, as shown in FIG. 1. The sight tube includes lenses, lens mountings, and a light reflection system such as are conventionally used in an electronic sight and which will not be described or illustrated in detail herein. The sight tube has a conventional light source for transmitting light into the sight tube for transmission through the lens and reflection system. The base includes the mounting system, horizontal adjustment, and vertical adjustment. The battery assembly includes the voltage control, electronics, and light source.

The sight tube 20 has a viewing area in which the horizontal viewing field is greater than the vertical viewing field. This is particularly useful when aiming at objects moving on the ground where the vertical movement of the object is very small compared to the horizontal movement along the ground. The large horizontal viewing field aids the user in keeping the target in the sight as the target moves along the ground. In conventional round lenses, making the horizontal viewing field large also makes the vertical viewing field large. This would cause the sight to have an undesirable high profile. As a consequence, to keep the sight profile low, the horizontal viewing field is limited in conventional scopes and electronic sights.

In the electronic sight 10 of the present invention, the sight tube 20 has a rectangular shape, as do the lenses within the sight tube, to achieve the advantage of a wide horizontal viewing field without having the disadvantage of a high-profile sight. The sight tube as shown in the figures has a horizontal viewing field that is at least one and one-half times larger than the vertical viewing field. While a rectangular shape is preferred, an oval sight tube could be used to provide similar advantages.

The sight tube 20 includes a front lens 30 and rear lens 32 through which the user views the target, as best shown in FIG. 10. The lenses do not provide any magnification. In this respect, the electronic sight of this invention is significantly different from telescopic sights. The front lens 30 is held in place by an interior retainer 34 and an exterior retainer 36. The front lens 30 also has a lens gasket 38 around its periphery to ensure a proper and snug fit in sight tube 20. Similarly, the rear lens 32 has an interior retainer 40, an exterior retainer 42, and a lens gasket 44 for holding the lens in position. The interior retainers 34 and 40 are shown as separate pieces; however, in one embodiment not shown they are a single, unitary piece which runs the length of the interior of the sight tube. The retainers and lenses are press fit into position within the sight tube rather than screwed in. Adhesive may also be used to ensure that the retainers and lenses stay fixed in the proper position. The retainers aid in ensuring that the lenses are properly positioned within the sight tube and with respect to each other and the light source.

The front lens 30 has a special reflective coating to reflect a dot of light back through the rear lens 32 to the eye of the user. The front lens may be a single lens or a compound lens, as desired. The front lens may be curved sightly or tipped to ensure that a light source from the top or side of the sight tube is reflected rearwardly straight out of the rear lens of the sight tube toward the user, but that ambient light entering through the front or rear lens is not similarly reflected or distorted. The rear lens 32 may be curved or tipped to offset any refraction of incoming light or reflected light to ensure that no magnification occurs. In the embodiment shown, the front lens at the front end of the sight tube is also the reflecting lens. Alternatively, the reflecting lens may be a separate lens mounted near the center of the sight tube for reflecting the light source. A center lens may also be used to avoid distortion of the view as seen by a user.

The front lens 30 has a peripheral shape which mates with the sight tube 20 such that the horizontal viewing field is much greater than the vertical viewing field. This provides a low-profile sight tube having a wide horizontal field of view, features which are very desirable for the user. The front lens is composed of a special composition of material that changes the tint of the lens based on ambient light conditions. As ambient light increases, the lens darkens; and when ambient light is lower, the lens becomes less dark to permit more light to pass therethrough. This aids in providing a sharp image of the reflected aiming dot under all types of lighting conditions. This type of material has been used in sunglass lenses. Conventional electronic sights use a polarized, adjustable lens. The polarized lens must be separately attached to the sight and manually adjusted from time to time. The use of a lens with variable tint based on ambient light eliminates the need for the polarizing component and periodic adjustment. This feature also allows the use of a lighter reflective coating on the lens to permit increased visibility of the target in low light conditions. The variable lens tint is more reliable then present polarizing lenses used to accomplish the same purpose. Further, a metallic coating may be optionally provided on the outside of the front lens. This option is not possible on present conventional electronic gun sights. The metallic coating option may be used in high ambient light conditions where maximum filtering of ambient light is required, and also has an aesthetic appeal to the user.

The rear lens 32 is also made of a material similar to that of the front lens 30, which changes tint based on ambient light conditions. The rear lens has a much lower degree of maximum tint than the front lens. This feature reduces the effects of ambient light shining into the rear of the sight tube through the rear lens and significantly improves use of the sight 10 by the user in the field and increases reliability. Other sights either fail to deal with this problem or do so only with a black paint on the inside of the tube, as explained herein below.

The inside of the sight tube 20 has a grooved interior surface 45, as shown in FIGS. 4, 13, and 14 with alternating grooves 46 and raised portions 48 extending lengthwise along the sight tube 20 around the entire interior surface. These grooves 46, as shown in FIGS. 13 and 14, assist in eliminating the glare effect from ambient light. The grooves 46 are in the range of 3 to 5 millimeters deep. The ridges 48 are in the range of 1 to 3 millimeters from tip to tip. The grooves may be steep, 60° or greater as shown in FIG. 14, or alternatively, at 45° as shown in FIG. 13. The grooves may be different sizes, depending on the desired final effect. Alternately, other broken surfaces instead of grooves may be used which will diffuse any light striking thereon and prevent reflection or aid in the elimination of ambient glare. Grooves are shown in the present embodiment because of the ease of making grooves when extruding the sight tube. In the event the sight tube is molded, other broken surface shapes such as crosshatching, may be conveniently used. The retainers 34, 36, 40 and 42 may also have grooves on their interior surfaces in addition to or in lieu of grooves on the interior of sight tube 20.

Prior art sight tubes, such as telescopic sights, are painted black on the interior to reduce the glare effect. Over time and through use, temperature cycling, aging, and other effects, the paint may crack or peel, resulting in unwanted glare. However, the grooves as used in the present invention, do not significantly degrade with temperature cycling, time passage or otherwise. The use of grooves or a broken surface on the interior surface results in more reliable glare reduction over the life of the sight. Further, the use of grooves is a significantly lower cost way to provide the glare reduction. The entire sight tube 20, including the interior surface 45 having grooves 46, may be anodized with black dye to aid in the elimination of the glare effect from ambient light, if desired. Anodizing with black dye is also significantly less expensive than painting with black paint and, coupled with the grooved interior surface 45, results in a much more reliable and glare-free sight than was previously possible.

The sight tube 20 has a raised rail 50 on the top exterior thereof extending the length of the sight tube and has a slot 51 therein (see FIG. 10). Screw holes 63 and 65 are provided in the sight tube at opposite ends of the slot for fixing a light source 60 positioned longitudinally with respect to the reflecting lens. An LED or other suitable device may be used as the light source.

The position of light source 60 with respect to the reflecting lens is critical. The reflecting lens has a focal point or optimum reflection point upon which the light from the light source 60 must impinge in order for the sight 10 to properly operate. If a small misalignment between the point where the light should strike and where it actually does strike occurs, the sight does not operate properly for the lens systems currently available. The permissible deviation from the intended light impingement point on the reflecting lens is small.

The light source 60 is solidly affixed to a battery housing 52 having a base plate 53. The light source is properly positioned by positioning the battery assembly housing relative to the sight tube 20. The raised rail 50 provides a locating key for the battery housing and positively locates the light source in the horizontal plane relative to the reflecting lens. The battery housing has a slot 49 on the underside of the base plate 53 which slidably mates with rail 50 of the sight tube 20 for longitudinal positioning of the housing and light source relative to the sight tube. The slot 49 has inwardly extending flanges that lock the battery housing onto the sight tube to prevent upward or side-to-side movement of the housing. The battery housing is solidly held in position by a large surface area contact to provide longer life and greater reliability, even under harsh conditions in the field. The battery housing may be moved only forward and backward along the raised rail 50. This significantly increases the reliability of the sight 10 by ensuring that the horizontal position of the light source with respect to the reflecting lens is always exactly correct. The sight will not drift or be movable out of proper alignment over time or by use in the field, even under harsh conditions.

The use of a raised rail 50 as the key with the internal slot 51 also reduces the number of improperly aligned sights. This also decreases the production time and cost to assemble the sight 10. Further, the tolerance to which the reflecting lens, retainers 34 and 36 and sight tube 20 must be manufactured is much looser than would otherwise be permitted. This is a significant manufacturing time and cost savings. While the rail 50 has been described as a raised rail having flanges, it will be understood that other suitable shapes for locating keys may be used. For example, an indented key in the form of a slot may be used in which the bottom of the battery housing 52 slides.

When assembling the sight 10, the battery assembly 24 is placed on the rail 50 and moved over the slot 51. The light source 60 is turned on, and light passes into the sight tube 20 and is reflected by the front lens 30 through the rear lens 32. Precision optical equipment at the manufacturing facility is used to properly align the light source with respect to the reflecting lens in the vertical direction. The battery housing is moved back and forth, with a pair of screws 64 and 66 loosely affixed to the rail 50 and extending through slots 54 and 56 in the housing. The slots 54 and 56 permit the battery housing holding the light source 60 to be moved along the rail 50 and fixed at the proper horizontal position on the rail with the light in the proper vertical position on the lens. The housing is then solidly connected by tightening screws 64 and 66 to prevent further movement. Sealing compound or glue may also be used. The relationship of the light source to the reflecting lens is critical and can be properly aligned only with precision optical equipment and is not usually changed by the user in the field. The reflecting lens may be the front lens or, alternatively, a separate lens mounted behind the front lens and within sight tube 20.

While the apparent position of the reflected light dot produced will change depending on the relative position of the viewer's eye, it is in fact stationary with respect to the lens and will always cover the point of impact even if it "appears" off-center within the sight tube 20 as viewed by the user. This feature is best shown in FIG. 6, having a light dot 61 positioned to overlay target 63. The point of impact will be on the light dot 61 even though it is off-center as seen by the viewer through the rear lens. This is a significant advantage of electronic sights. Prior art devices which position the light source using an oversized hole and gluing the light source in position do not provide as reliable a manner for positioning the light source as does the present invention.

The slot 51 is shown within the rail 50; however, the slot could be located separate from the rail. Further, the locating rail, having an internal slot, could be on one side of the sight tube rather than on the top. The present design provides the advantage of having the center of gravity of the battery assembly 24 and sight tube 20 along the same line as the gun.

The sight tube 20 is manufactured as an extrusion. This significantly reduces the initial cost of production and allows inexpensive changes in the product configuration. Prior art sights are manufactured using costly precision castings. This prior art technology restricts change and results in increased product cost due to tooling requirements. The battery housing 52 and its base plate 53 may also be manufactured as extrusions, if desired; however, the additional machining necessary for the base plate makes it an ideal candidate for a casting mold.

The sight tube 20 is machined to have the desired holes and slots after it is extruded. The sight tube is then anodized with black dye, both inside and out, as is well known in the industry. This is performed by immersing the entire sight tube in the appropriate anodizing liquids and performing the anodizing steps as is well known.

The sight tube 20 is a complete assembly separate from the base 22. A single fastener screw 92 is used to join the two components. This allows watertight construction of the portion of the sight tube holding the optics and the battery housing 52 at a lower cost than previously possible. The sight tube and battery housing may each be completely assembled and sealed independent of the base 22. This permits more reliable final products and a lower assembly cost.

The battery housing 52 holds a battery 68. A voltage adjustment controller 70 is coupled in the circuit with the light source 60 to permit the user to vary the voltage applied to the light source by turning voltage control knob 74. This directly controls the intensity of the light source and includes an on/off switch function. An end cap 72 is coupled to one end of the battery housing 52 and also contacts the battery 68 to complete the electric circuit. Appropriate retainers, sealing washers and insulating washers, 76 and 78 are provided to hold the battery, voltage controller, end cap, and light source in position.

The battery housing 52 is manufactured for various permitted sizes and styles of batteries to be used therewith. The manufacturer may completely assemble a variety of different battery assemblies 24, each having different features, such as different light sources, battery styles, voltage controllers, remote switches and the like, as desired. The raised rail 50 of the sight tube 20 will permit any of these battery assembly configurations to be conveniently used therewith. The user may request a particular battery assembly and this can be easily provided by the seller or manufacturer and aligned as described herein. The cost advantages of this approach over different custom sights for each type of battery configuration are significant.

The battery assembly 24 is mounted with its center of gravity in the same vertical plane containing the center of gravity of the sight tube 20. In addition, the center of gravity of the sight 10 when mounted on the gun is preferably positioned directly above the center of gravity of the gun so as not to significantly change the balance of the gun. It is desirable to avoid the problem of unbalancing the gun due to the added weight of the sight. Since the battery assembly 24 with battery 68 therein are relatively heavy compared to the other parts of the sight, it is useful to have the battery assembly centered to ensure that the sight does not cause the user to fatigue from having to hold the gun in the aiming position while applying a force to counteract the rotational force produced if the sight is not properly located with respect to the center of gravity of the gun. Prior art electronic sights mount the battery and light source on the side of the gun, adding a component of force tending to rotate the gun in the hands of the user about the longitudinal axis of the gun. While this may not be a strong force, it creates an imbalance in the gun and also causes early user fatigue. The alignment of the sight and battery assembly of the present invention avoids this problem.

A remote membrane battery switch 120 is provided in an alternative embodiment, as shown in FIG. 11. In this embodiment the end cap 72 is coupled through the membrane switch 120 located at a remote location, such as on the handle of the gun. The voltage control knob 74 is adjusted to the correct voltage according to the desired light intensity of the light source 60 while pressing the membrane switch on. The voltage control is left on. When pressure is released from the membrane switch, the circuit is broken and the light goes out. When the user is ready to shoot, he raises the gun to the ready position to sight and shoot at the target. In the same movement, the user's hand presses the membrane switch to turn the light on to permit sighting the target. The membrane switch may be placed on the handle of the gun, near the trigger, in the butt, or at some other location that the user will automatically depress when shooting the gun. This feature conserves battery power because the light source is generally off and is only used when preparing to shoot. Without this feature, the light must be left on at all times, which significantly reduces battery life.

An alternative embodiment is the use of a remote battery connector 122, shown in FIG. 12. The battery is carried in the shirt or coat pocket of the user, and a connector wire 124 connects the battery to the circuit through an end cap 122. The cap 122 is appropriately coupled to the voltage adjustment controller 70 to replace the battery 68. This permits the battery to be left out of the housing 52. The battery is relatively heavy and can add significantly to the weight of the gun. This embodiment is particularly useful in competition shooting, when the user may be shooting for long periods of time and is very concerned about the weight and balance of the gun.

The base 22 allows the user to mount the sight 10 on an industry standard-type dovetail member. The user may desire to adjust the horizontal or lateral position of the sight tube 20 with respect to the base and hence the longitudinal axis of the gun. This horizontal adjustment is known in the industry as the "windage adjustment." The adjustment is used to properly sight the gun. The correct horizontal position may vary from firearm to firearm and also vary slightly over time on the same firearm. The user may also adjust the vertical position of the rear of the sight tube with respect to the base. This varies the angle of the sight tube with respect to the base and provides a vertical adjustment known in the industry as the "elevation adjustment."

The sight tube 20 is coupled to the base 22 using a screw 92 that extends through an attachment hole 96 in a horizontal base wall 93 to a flanged retainer 94. A flange 95 off the retainer is positioned below the base wall 93 and is sufficiently large that it will not pull upward through hole 96. A spring washer 98 is disposed between the base wall 93 and the flange 95 and an upstanding portion 97 of the retainer 94 extends upwardly through the center hole of the washer. When the screw 92 is solidly attached to the retainer 94, thus solidly connecting the sight tube to the base, the sight tube may be rotated with respect to the base. The spring washer 98 between the retainer and the base wall provides a biasing force between the sight tube and the base to hold the sight tube firmly in position during use but permitting relative movement if sufficient force is applied. In the preferred embodiment, washer 98 is a steel wavy washer to provide strength with a low profile. Other spring-type members may be used but they should have sufficient strength to prevent any movement of sight tube 20 other than controlled movement such as by windage screen 84 or elevation Jack 132.

Cylindrical pivot fulcrum bearings 102 are located on either side of the attachment hole 96. The sight tube 20 rests on the pivot bearings 102 and is supported slightly above the base 22 by bearings 102, as best shown in FIGS. 9 and 10. The screw 92 provides a vertical first axis of rotation 122 of the sight tube with respect to the base and the pivot bearings 102 provide a horizontal axis of rotation 174, which is perpendicular to the first axis and crosses through the first axis.

The horizontal pivot axis 174, at the top edge of fulcrum bearing 102 that crosses through the vertical axis 172, permits a simplified construction. A single screw 92 to secure the sight tube to the base is sufficient to provide the necessary attachment point. The sight tubes horizontally pivot axis 174 is thus located through the vertical pivot axis 172 defined by the screw 92, as shown in FIG. 10.

The horizontal or windage adjustment is provided by a windage assembly 80, as shown in FIGS. 7, 8 and 10. The windage assembly provides the horizontal adjustment of the sight tube 20 with respect to the base 22. The axis 172 at screw 92 provides a first point of attachment of the sight tube to the base and the windage assembly provides a second point of coupling offset from the first point. By moving the sight tube at one end laterally back and forth with the windage assembly, the sight tube pivots about the vertical axis 122 at screw 92 as shown in FIGS. 7, 8 and 10.

The windage assembly 80 includes a windage disk 82 and a windage screw 84, as shown in FIGS. 7, 8 and 10. The windage screw has threads 86, at least along the central region thereof. Windage disk 82 has a threaded interior hole 88 through which the windage screw extends and threadably engages mating threads of the windage screw. Rotating the windage screw moves the windage disk laterally along the length of the screw. The windage disk fits into a hole 90 in base wall 93. The hole 90 is an elongated hole, being somewhat larger in the lateral dimension than the diameter of the windage disk 82. This permits the windage disk 82 to move laterally back and forth within hole 90 by rotating screw 84 in one direction or another. The hole 90 is in the form of a slot in which the windage disk fits snug against the forward and rearward interior edges of the hole, but is free to move laterally to permit the windage disk to move back and forth a desired maximum distance. This allows the user to vary the horizontal position of the sight tube with respect to the base.

A recess 92 is provided in the bottom of sight tube 20, as shown in FIGS. 7 and 8. The windage disk fits snug within this recess in the lateral direction but the recess is elongated in the forward and rearward directions along the length of sight tube 20. As the windage disk moves laterally back and forth with respect to the base 22 to pivot the sight tube, the sight tube swings in an arc with respect to the windage disk 82. The recess 92 is elongated in the forward and rearward directions to permit the sight tube to pivot a desired maximum amount and retain the windage disk within the recess 92. As noted above, holes 90 and recess 92 are elongated in directions perpendicular to each other, and when viewed together from the bottom, they form a cross, as seen in FIG. 7.

A locking nut 104 on the end of windage screw 84 is provided to firmly hold the windage screw in position and prevent its undesirable rotation. Wavy spring washers 106 and 108 are used to achieve stability of the windage assembly. As an alternative washer, a number of disks made of compressible, resilient material may be used. The washers provide constant lateral force on the adjustment windage screws, providing stable, repeatable adjustment. Horizontal force exerted by the washers eliminates the need for adjustment due to recoil vibration.

A thumb-operated elevation jack 130 having an elevation screw 132 is used to adjust the elevation of the sight tube 20 to set the range, as shown in FIGS. 9 and 10. The elevation screw 132 is threadably received in a correspondingly threaded hole 133 in the base wall 93, and rotating the elevation jack selectively either raises or lowers the rear of the sight tube relative to the base 22. An upward protrusion 135 bears against a bearing plate 137. A spring washer 136 is provided at the front of the sight to bias the front upwards and the back downwards, solidly against the elevation screw 132. The elevation screw changes the elevational angle of the sight tube 20 with respect to the base 22, and this adjusts the vertical position of the reflected light dot with respect to the base and to the gun barrel. The sight tube pivots about pivot pins 102 as the elevation screw is moved up and down to adjust the vertical position of the light dot with respect to the point of impact to ensure that the sight is aligned accurately. This elevation adjustment is also used to adjust for range when shooting at close targets or at distant targets.

A threaded plug 138 holds a spring 140 and a retaining ball 142 in an aperture 139 with the ball resiliently pressing against correspondingly sized detent notches in the periphery of the elevation jack 130, thus allowing the required adjustment to be in small, convenient increments. The increments can be labeled for specific ranges. The plug 138 can be rotated, moving it in or out to make rotation of elevation jack 130 for adjustment of the elevation require more or less force. If desired, the elevation can be locked at a specific distance by fully tightening of the plug. This type of elevation adjustment increases reliability and decreases cost over the elevation adjustment mechanisms used in current electronic sights.

The center pivot design of this electronic sight 10 is a significant advantage. Controlled tolerance of the center pivot 102 clearance hole 96 allows the sight tube 20 to pivot both vertically and horizontally to achieve the desired windage and elevation adjustments. The axes intersect each other to provide a single, common pivot point for movement in both the horizontal and vertical directions. The sight tube pivots about each axis independent of pivoting about the other axis. The construction and operation of the sight are very simple compared to the construction and operation of current electronic gun sights, yet this sight is more reliable. The number of precision components needed to produce this sight is significantly reduced by the overall construction and design. The use of the flat, wavy washer-type springs 98 and 136 permits greater loading of the assembly, with a significantly lower profile than would be possible with conventional springs, though conventional springs could be used.

The base 22 is fastened to the gun by an industry standard dovetail lock groove 153 therein using a pair of clamping lugs 154, 156 which threadably receive fastening bolts 150, 152. The use of the dovetail lock groove provides a positive locking force in both the vertical and horizontal planes. Recoil forces are transmitted to the sight through the dovetail lock groove. This provides an increased contact area and also provides greater strength to retain the sight on the gun. Prior art devices using screws or separate clamping devices are less reliable and are more likely to be damaged under harsh conditions in the field or from repeated firing of the gun.

The sight 10 may be attached to and used with a variety of shooting devices, including firearms, bows, and crossbows. The sight may be attached to any type of firearm, such as a pistol, shotgun or rifle.

Particular embodiments have been described herein, but any substitute or equivalent structure performing substantially the same function in substantially the same way falls within the scope of this invention.

I claim:

1. An electronic sight for attaching to a shooting apparatus, comprising:
   a base member to attach the sight to the shooting apparatus;
   a longitudinally extending sight tube for viewing a target therethrough, said sight tube being pivotally coupled to said base for permitting said sight tube to pivot about two different axes independent of each other, said sight tube having a horizontal viewing field larger than a vertical viewing field;
   a front lens connected to a front of said sight tube;
   a back lens connected to a back of said sight tube; and
   a light source positioned to be reflected from said front lens and through said back lens for viewing by a user.

2. The sight according to claim 1 wherein said sight tube is generally rectangular in cross section.

3. The sight according to claim 2 wherein said horizontal viewing field is one and a half times larger than said vertical viewing field.

4. The sight according to claim 1 wherein said sight tube has a housing comprised of an extrusion.

5. The sight according to claim 1 wherein said sight tube includes grooves on an inside surface thereof to aid in the elimination of reflective glare from ambient light sources.

6. The sight according to claim 1 wherein said sight tube includes a layer of dye applied to an interior surface thereof by electroplating to aid in reducing reflective glare from ambient light sources.

7. The sight according to claim 1 further including a battery coupled to said sight tube; and
   a switch for electrically coupling said battery to said light source, said switch being located at a location remote from said sight tube.

8. The sight according to claim 7 wherein said battery is located at a location remote from said sight tube.

9. The sight according to claim 1, further including an elevation adjustment assembly for pivoting said sight tube about a first axis for varying an elevational angle of said sight tube with respect to said base.

10. The sight according to claim 1, further including a windage adjustment assembly for pivoting said sight tube about a generally vertical axis for angularly varying said sight tube with respect to said base through a generally horizontal plane.

11. The sight according to claim 1 wherein the sight has a center of gravity and said base member is attachable to the shooting apparatus with said sight center of gravity located generally in a vertical plane containing the center of gravity of the shooting apparatus when in the firing position.

12. An electronic sight for attaching to a shooting apparatus, comprising:
    a base member to attach the sight to the shooting apparatus;
    a longitudinally extending sight tube for viewing a target therethrough, said sight tube being pivotally coupled to said base and said sight tube including a key having a raised rail extending above said sight tube and extending lengthwise along said sight tube to aid in positioning said light source longitudinally with respect to said sight tube while inhibiting lateral movement thereof;
    a front lens connected to a front of said sight tube;
    a back lens connected to a back of said sight tube; and
    a light source positioned to be reflected from said front lens and through said back lens for viewing by a user.

13. An electronic sight for attaching to a shooting apparatus, comprising:
    a base member to attach the sight to the shooting apparatus;
    a longitudinally extending sight tube for viewing a target therethrough, said sight tube being pivotally coupled to said base wherein said sight tube includes an opening for transmitting light into said sight tube, said opening extending lengthwise along said sight tube for transmission of the light from selected lengthwise positions in order to permit a reflection point of said light from said front lens to be positioned vertically to aid in positioning said light source longitudinally with respect to said sight tube while inhibiting lateral movement thereof;
    a front lens connected to a front of said sight tube;
    a back lens connected to a back of said sight tube; and
    a light source positioned to be reflected from said front lens and through said back lens for viewing by a user.

14. The sight according to claim 13 wherein said opening extends through said key.

15. An electronic sight for attaching to a shooting apparatus, comprising:

a base member to attach the sight to the shooting apparatus;

a longitudinally extending sight tube for viewing a target therethrough, said sight tube being pivotally coupled to said base;

a front lens connected to a front of said sight tube, said front lens being composed of a material which darkens to a degree of tint when ambient light increases to block transmission of a portion of some of said light;

a back lens connected to a back of said sight tube; and a light source positioned to be reflected from said front lens and through said back lens for viewing by a user.

16. The sight according to claim 15 wherein said back lens is composed of a material which darkens to a degree of tint when said ambient light increases so as to block transmission of a portion of said light impinging upon said back lens.

17. The sight according to claim 16 wherein said back lens darkens to a lesser amount of tint than said front lens.

18. The method of sighting a target using an electronic sight having a sight tube and an aiming dot projected within the sight tube, comprising:

selectively pivoting said sight tube about a vertical axis until said aiming dot is in a desired horizontal position; and selectively pivoting said sight tube about a horizontal axis until said aiming dot is in a desired vertical position, said vertical and horizontal axes intersecting each other.

19. An electronic gun sight for attaching to a firearm, comprising:

a base member attachable to said firearm;

a sight tube member pivotally attached to said base member;

a light source;

a front lens supported by said sight tube member for reflecting light from said light source within said sight tube member to the eyes of the firearm user;

a threaded screw in said base member; and a lug threadably coupled to said screw for moving along said screw when said screw is rotated, said lug being attached to said sight tube member for pivoting said sight tube member about an axis when said screw is rotated to provide a windage adjustment of said sight.

20. The sight according to claim 19 wherein said lug extends into an elongated opening in said base and extends into an elongated opening in said sight tube, said sight tube opening having a width substantially equal to a width of said lug and a length greater than a length of said lug for permitting said lug to move longitudinally with respect to said sight tube.

21. The sight according to claim 19 further including a flat wavy-washer acting as a resilient spring member positioned between a head on said threaded screw and said base member.

22. The method of making an electronic gun sight, comprising:

extruding a sight tube using an extrusion mold;

attaching a front lens to said sight tube, said front lens having a larger horizontal dimension than a vertical dimension;

coupling to said sight tube to a base; and coupling a light source to said sight tube for reflection from said front lens.

23. The method according to claim 22, further comprising electroplating said sight tube on substantially all surfaces to aid in eliminating reflective glare from ambient light prior to coupling said sight tube to said base.

24. The method according to claim 22 wherein said extrusion step includes extending said sight tube to place grooves on an inside surface of said sight tube.

25. The method according to claim 22, further including the steps of:

press fitting said front lens into said sight tube at a forward end thereof; and press fitting a back lens into said sight tube at a rearward end thereof.

26. The method of making an electronic gun sight, comprising:

extruding a sight tube using an extrusion mold;

attaching a front lens to said sight tube;

coupling said sight tube to a base;

providing said sight tube with a longitudinally extending key;

providing a housing containing said light source;

aligning said housing with said key;

loosely coupling said housing to said sight tube to permit movement of said housing longitudinally relative to said sight tube guided by said key;

moving said housing longitudinally to vertically position said light source on said front lens; and tightly coupling said housing to said sight tube when said light source is in the desired vertical position.

27. An electronic sight for attaching to a shooting apparatus, comprising:

a base member adapted to be attached to a shooting apparatus;

a longitudinally extending sight tube for viewing a target therethrough, said sight tube being pivotally coupled to said base;

a front lens coupled to a front of said sight tube, said front lens having a horizontal viewing field larger than its vertical viewing field;

a back lens connected to a back of said sight tube; and a light source positioned to be reflected from said front lens and through said back lens for viewing by a user.

28. The electronic sight according to claim 27 wherein said sight tube has a horizontal viewing field larger than its vertical viewing field along its entire longitudinal length and said back lens has a horizontal viewing field larger than its vertical viewing field.

29. The electronic sight according to claim 27 wherein said front lens is generally rectangular in cross section.

30. The sight according to claim 30 wherein said front lens is generally oval in cross section.

31. The electronic gun sight according to claim 19, further including a threaded elevation jack means for providing an elevation adjustment by pivoting said sight tube about a horizontal axis.

32. The electronic gun sight according to claim 31 wherein said horizontal axis intersects said axis about which said sight tube is pivoted when said screw is rotated.

33. The electronic gun sight according to claim 32, further including a pivot positioned between said base member and said sight tube, said sight tube being supported by said pivot.

34. The electronic gun sight according to claim 33 wherein said sight tube rests on top of said pivot.

35. An electronic gun sight for attaching to a firearm, comprising:

a base member attachable to said firearm;

a sight tube pivotally attached to said base member;

a light source coupled to said sight tube;

a front lens means supported by said sight tube member for reflecting light from said light source within said sight tube member to the eyes of a user;

a windage adjustment means for adjusting the horizontal position of said sight tube relative to said firearm by pivoting said sight tube relative to said firearm about a vertical axis; and an elevation adjustment means for adjusting the elevation of said sight tube by pivoting said sight tube about a horizontal axis, said vertical and horizontal axes intersecting each other.

36. The electronic gun sight according to claim 35 wherein said sight tube has a horizontal viewing field larger than its vertical viewing field.

37. An electronic sight for attaching to a shooting apparatus, comprising:

a base member adapted to attach to a shooting apparatus;

a longitudinally extending sight tube for viewing a target therethrough, said sight tube being pivotally coupled to said base member;

a front lens connected to a front of said sight tube;

a back lens connected to a back of said sight tube;

a light source positioned to be reflected from said front lens and through said back lens for viewing by a user;

a power source for providing power to illuminate said light source; and a switch for electrically coupling said power source to said light source, said switch being positioned at a location remote from said sight tube.

38. The electronic sight according to claim 37 wherein said switch is positioned on the handle of said gun at a location contacted by a user's hand when the user is gripping the gun in the ready position for shooting.

39. The electronic sight according to claim 37 wherein said switch is adjacent the trigger of the gun.

* * * * *